US012811636B2

(12) United States Patent
Song et al.

(10) Patent No.: US 12,811,636 B2
(45) Date of Patent: Nov. 24, 2026

(54) METHOD AND APPARATUS FOR TRANSMISSION BASED ON MULTIPLE INPUT AND MULTIPLE OUTPUT IN LINE-OF-SIGHT CHANNEL ENVIRONMENT

(71) Applicant: ELECTRONICS AND TELECOMMUNICATIONS RESEARCH INSTITUTE, Daejeon (KR)

(72) Inventors: Young Seog Song, Daejeon (KR); Eun Young Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 19/002,376

(22) Filed: Dec. 26, 2024

(65) Prior Publication Data

US 2025/0317168 A1 Oct. 9, 2025

(30) Foreign Application Priority Data

Apr. 9, 2024 (KR) ........................ 10-2024-0048060

(51) Int. Cl.
*H04B 7/0456* (2017.01)

(52) U.S. Cl.
CPC .................................. *H04B 7/0478* (2013.01)

(58) Field of Classification Search
CPC .................................................... H04B 7/0478
USPC .......................................................... 375/267
See application file for complete search history.

(56) References Cited

U.S. PATENT DOCUMENTS

| | | | | |
|---|---|---|---|---|
| 8,737,505 | B2 | 5/2014 | Shin et al. | |
| 8,743,998 | B2 | 6/2014 | Kwon et al. | |
| 10,044,423 | B2 | 8/2018 | Penna et al. | |
| 10,224,990 | B2 | 3/2019 | Kim et al. | |
| 10,749,579 | B1 | 8/2020 | Omar et al. | |
| 2011/0122971 | A1 * | 5/2011 | Kim ..................... | H04B 7/0663 375/316 |

(Continued)

FOREIGN PATENT DOCUMENTS

| | | | | |
|---|---|---|---|---|
| KR | 1020170020357 A | | 2/2017 | |
| KR | 102502746 B1 | | 2/2023 | |
| WO | WO-2018028687 A1 | * | 2/2018 | ............... H04B 7/02 |

OTHER PUBLICATIONS

Kobayashi, Kenichi, et al., "Precoding for MIMO systems in Line-of-Sight (LOS) Environment", IEEE Global Telecommunications Conference, IEEE Communications Society, IEEE Globecom, Nov. 26-30, 2007.

*Primary Examiner* — Leila Malek
(74) *Attorney, Agent, or Firm* — Rabin & Berdo, P.C.

(57) ABSTRACT

A method of a first communication node may comprise: obtaining a channel matrix or a plurality of phase vectors based on predetermined line-of-sight multiple input multiple output (LOS MIMO) channel configuration information; determining a precoding matrix satisfying a first condition and a second condition using the channel matrix or the plurality of phase vectors; and transmitting data to a second communication node including a second antenna array by performing beamforming at the first communication node including a first antenna array based on the precoding matrix, wherein the first antenna array includes N elements, the second antenna array includes L elements, and each of L and N is a natural number greater than or equal to 2.

12 Claims, 9 Drawing Sheets

(56) References Cited

U.S. PATENT DOCUMENTS

| | | | | |
|---|---|---|---|---|
| 2018/0331744 | A1* | 11/2018 | Gao | H04B 7/0617 |
| 2020/0177268 | A1 | 6/2020 | Shahmohammadian et al. | |
| 2020/0388935 | A1* | 12/2020 | Lee | H04L 27/2634 |
| 2022/0247465 | A1 | 8/2022 | Graybeal et al. | |
| 2023/0155645 | A1* | 5/2023 | Lee | H04B 7/0447 375/267 |

* cited by examiner

100

METHOD AND APPARATUS FOR TRANSMISSION BASED ON MULTIPLE INPUT AND MULTIPLE OUTPUT IN LINE-OF-SIGHT CHANNEL ENVIRONMENT

CROSS-REFERENCE TO RELATED APPLICATIONS

This application claims priority to Korean Patent Application No. 10-2024-0048060, filed on Apr. 9, 2024, with the Korean Intellectual Property Office (KIPO), the entire contents of which are hereby incorporated by reference.

BACKGROUND

1. Technical Field

The present disclosure relates to a transmission technique in a communication system, and more particularly, to a technique for enhance transmission performance based on multiple input multiple output (MIMO) in a line of sight (LOS) channel environment.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g. Long Term Evolution (LTE) communication system or LTE-Advanced (LTE-A) communication system), the 5th generation (5G) communication system (e.g. new radio (NR) communication system) that uses a frequency band (e.g. a frequency band of 6 GHz or above) higher than that of the 4G communication system as well as a frequency band of the 4G communication system (e.g. a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

With the commercialization of 5G communication, the demand for data traffic is expected to continue increasing explosively. Accordingly, there is a growing demand for improved transmission speeds and enhanced capacity. Technologies for high-capacity wireless transmission in high-frequency bands, such as millimeter wave (mmWave) and terahertz (THz) bands, are required.

SUMMARY

The present disclosure for resolving the above-described problems is directed to providing a method and apparatus for enhancing transmission performance in a communication supporting MIMO in an LOS channel environment.

A method of a first communication node, according to exemplary embodiments of the present disclosure, may comprise: obtaining a channel matrix or a plurality of phase vectors based on predetermined line-of-sight multiple input multiple output (LOS MIMO) channel configuration information; determining a precoding matrix satisfying a first condition and a second condition using the channel matrix or the plurality of phase vectors; and transmitting data to a second communication node including a second antenna array by performing beamforming at the first communication node including a first antenna array based on the precoding matrix, wherein the first antenna array includes N elements, the second antenna array includes L elements, and each of L and N is a natural number greater than or equal to 2.

The precoding matrix may calculated using a Hermitian transpose of the channel matrix, and the precoding matrix may be expressed as Equation 1-A using the channel matrix.

$$P = \frac{1}{\sqrt{N}} \cdot \frac{1}{\sqrt{L}} \cdot H^H \quad \text{[Equation 1-A]}$$

Here, P represents the precoding matrix, H represents the channel matrix, and H #represents the Hermitian transpose of H.

The precoding matrix may calculated using the plurality of phase vectors, and the precoding matrix may be expressed as Equation 1-B using the plurality of phase vectors.

$$P = \frac{1}{\sqrt{N}} \cdot \frac{1}{\sqrt{L}} \cdot [\exp(j \cdot \pi \cdot \phi_1) \;\; \exp(j \cdot \pi \cdot \phi_2) \;\; \ldots \;\; \exp(j \cdot \pi \cdot \phi_L)] \quad \text{[Equation 1-B]}$$

Here, P represents the precoding matrix, and $\varnothing_1$, $\varnothing_2$, . . . , and $\varnothing_L$ represent the plurality of phase vectors.

The precoding matrix may include L precoding vectors, the first condition may be satisfied when elements of a first precoding vector and elements of a second precoding vector among the L precoding vectors are symmetrical to each other, the precoding matrix may be expressed as Equation 1-C, and each of the first precoding vector and the second precoding vector may be expressed as Equation 1-D.

$$P = [p_1 \;\; p_2 \;\; \ldots \;\; p_L] \quad \text{[Equation 1-C]}$$

$$p_{1+k} = [v_1 \;\; v_2 \;\; \ldots \;\; v_{N-1} \;\; v_N]^T, \quad p_{L-k} = [v_N \;\; v_{N-1} \;\; \ldots \;\; v_2 \;\; v_1]^T (k = 0, 1, \ldots, \lceil L/2 \rceil - 1) \quad \text{[Equation 1-D]}$$

Here, P represents the precoding matrix, $p_1$ $p_2$ . . . $p_L$ represent the L precoding vectors, $p_{1+k}$ represents the first precoding vector, $p_{L-k}$ represents the second precoding vector, and $\lceil x \rceil$ is a smallest integer equal to or greater than x.

The precoding matrix may include L precoding vectors, the second condition may be satisfied when L is odd and elements of a middle precoding vector located in a middle of the L precoding vectors are symmetrical to each other, and the middle precoding vector may be expressed as Equation 1-E.

$$p_{L-k} = [v_N \;\; v_{N-1} \;\; \ldots \;\; v_2 \;\; v_1]^T \quad v_1 = v_N, \;\; v_2 = v_{N-1}, \; \ldots, \; v_{\lceil L/2 \rceil - 1} = v_{\lceil L/2 \rceil + 1} \quad \text{[Equation 1-E]}$$

Here, $p_{\lceil L/2 \rceil}$ represents the middle precoding vector, and $\lfloor x \rfloor$ is a largest integer equal to or less than x.

The transmitting of the data to the second communication node may comprise: transmitting a pilot signal to the second communication node; receiving, from the second communication node, feedback information including information of a precoding matrix for a channel state between the first communication node and the second communication node; confirming the precoding matrix included in a codebook using the feedback information; and transmitting the data to the second communication node by performing beamforming based on the precoding matrix included in the codebook.

A method of a second communication node, according to exemplary embodiments of the present disclosure, may comprise: receiving a pilot signal from a first communication node; performing an operation of estimating a channel between the first communication node and the second communication node based on the pilot signal to obtain line-of-sight multiple input multiple output (LOS MIMO) channel information; determining a first precoding matrix based on the LOS MIMO channel information in a codebook including two or more precoding matrixes that satisfy a first condition and a second condition; and transmitting feedback information including information of the first precoding matrix to the first communication node.

The first precoding matrix may include L precoding vectors, the first condition may be satisfied when elements of a first precoding vector and elements of a second precoding vector among the L precoding vectors are symmetrical to each other, L may be a natural number equal to or greater than 2, the first precoding matrix may be expressed as Equation 2-A, and each of the first precoding vector and the second precoding vector may be expressed as Equation 2-B, $$P = [\, p_1 \;\; p_2 \;\; \ldots \;\; p_L \,] \qquad \text{[Equation 2-A]}$$

$$p_{1+k} = [\, v_1 \;\; v_2 \;\; \ldots \;\; v_{N-1} \;\; v_N \,]^T, \qquad \text{[Equation 2-B]}$$

$$p_{L-k} = [\, v_N \;\; v_{N-1} \;\; \ldots \;\; v_2 \;\; v_1 \,]^T \;\; (k = 0, 1, \ldots , \lceil L/2 \rceil - 1)$$

Here, P represents the first precoding matrix, $p_1$ $p_2$ . . . $p_L$ represent the L precoding vectors, $p_{1+k}$ represents the first precoding vector, and $p_{L-k}$ represents the second precoding vector.

The first precoding matrix may include L precoding vectors, the second condition may be satisfied when L is odd and elements of a middle precoding vector located in a middle of the L precoding vectors are symmetrical to each other, L may be a natural number equal to or greater than 2, and the middle precoding vector may be expressed as Equation 2-C.

$$p_{L-k} = [\, v_N \;\; v_{N-1} \;\; \ldots \;\; v_2 \;\; v_1 \,]^T \qquad \text{[Equation 2-C]}$$

$$v_1 = v_N,\, v_2 = v_{N-1},\, \ldots ,\, v_{\lceil L/2 \rceil - 1} = v_{\lceil L/2 \rceil + 1},$$

Here, $p_{\lceil L/2 \rceil}$ represents the middle precoding vector.

A first communication node, according to exemplary embodiments of the present disclosure, may comprise at least one processor, wherein the at least one processor causes the first communication node to perform: obtaining a channel matrix or a plurality of phase vectors based on predetermined line-of-sight multiple input multiple output (LOS MIMO) channel configuration information; determining a precoding matrix satisfying a first condition and a second condition using the channel matrix or the plurality of phase vectors; and transmitting data to a second communication node including a second antenna array by performing beamforming at the first communication node including a first antenna array based on the precoding matrix, wherein the first antenna array includes N elements, the second antenna array includes L elements, and each of L and N is a natural number greater than or equal to 2.

The precoding matrix may calculated using a Hermitian transpose of the channel matrix, and the precoding matrix may be expressed as Equation 3-A using the channel matrix.

$$P = \frac{1}{\sqrt{N}} \cdot \frac{1}{\sqrt{L}} \cdot H^H \qquad \text{[Equation 3-A]}$$

Here, P represents the precoding matrix, H represents the channel matrix, and $H^H$ represents the Hermitian transpose of H.

The precoding matrix may calculated using the plurality of phase vectors, and the precoding matrix may be expressed as Equation 3-B using the plurality of phase vectors.

[Equation 3-B]

$$P = \frac{1}{\sqrt{N}} \cdot \frac{1}{\sqrt{L}} \cdot [\, \exp(j \cdot \pi \cdot \phi_1) \;\; \exp(j \cdot \pi \cdot \phi_2) \;\; \ldots \;\; \exp(j \cdot \pi \cdot \phi_L) \,]$$

Here, P represents the precoding matrix, and $\emptyset_1$, $\emptyset_2$, . . . , and $\emptyset_L$ represent the plurality of phase vectors.

The precoding matrix may include L precoding vectors, the first condition may be satisfied when elements of a first precoding vector and elements of a second precoding vector among the L precoding vectors are symmetrical to each other, the precoding matrix may be expressed as Equation 3-C, and each of the first precoding vector and the second precoding vector may be expressed as Equation 3-D.

$$P = [\, p_1 \;\; p_2 \;\; \ldots \;\; p_L \,] \qquad \text{[Equation 3-C]}$$

$$p_{1+k} = [\, v_1 \;\; v_2 \;\; \ldots \;\; v_{N-1} \;\; v_N \,]^T, \qquad \text{[Equation 3-D]}$$

$$p_{L-k} = [\, v_N \;\; v_{N-1} \;\; \ldots \;\; v_2 \;\; v_1 \,]^T \;\; (k = 0, 1, \ldots , \lceil L/2 \rceil - 1)$$

Here, P represents the precoding matrix, $p_1$ $p_2$ . . . $p_L$ represent the L precoding vectors, $p_{1+k}$ represents the first precoding vector, $p_{L-k}$ represents the second precoding vector, and $\lceil x \rceil$ is a smallest integer equal to or greater than x.

The precoding matrix may include L precoding vectors, the second condition may be satisfied when L is odd and elements of a middle precoding vector located in a middle of the L precoding vectors are symmetrical to each other, and the middle precoding vector may be expressed as Equation 4-E.

$$p_{L-k} = [\, v_N \;\; v_{N-1} \;\; \ldots \;\; v_2 \;\; v_1 \,]^T \qquad \text{[Equation 4-E]}$$

$$v_1 = v_N,\, v_2 = v_{N-1},\, \ldots ,\, v_{\lceil L/2 \rceil - 1} = v_{\lceil L/2 \rceil + 1}$$

Here, $p_{\lceil L/2 \rceil}$ represents the middle precoding vector, and $\lfloor x \rfloor$ is a largest integer equal to or less than x.

In the transmitting of the data to the second communication node, the at least one processor may cause the first communication node to perform: transmitting a pilot signal to the second communication node; receiving, from the second communication node, feedback information including information of a precoding matrix for a channel state between the first communication node and the second communication node; confirming the precoding matrix included in a codebook using the feedback information; and transmitting the data to the second communication node by performing beamforming based on the precoding matrix included in the codebook.

According to the present disclosure, a communication node can perform communication using multi-input multi-output (MIMO) in a line-of-sight (LOS) channel environment. When a precoding codebook suitable for the LOS channel environment is applied, the transmission performance of the communication node can be enhanced. Accordingly, the performance of the communication system can be enhanced.

DETAILED DESCRIPTION OF THE EMBODIMENTS

Figure 1:
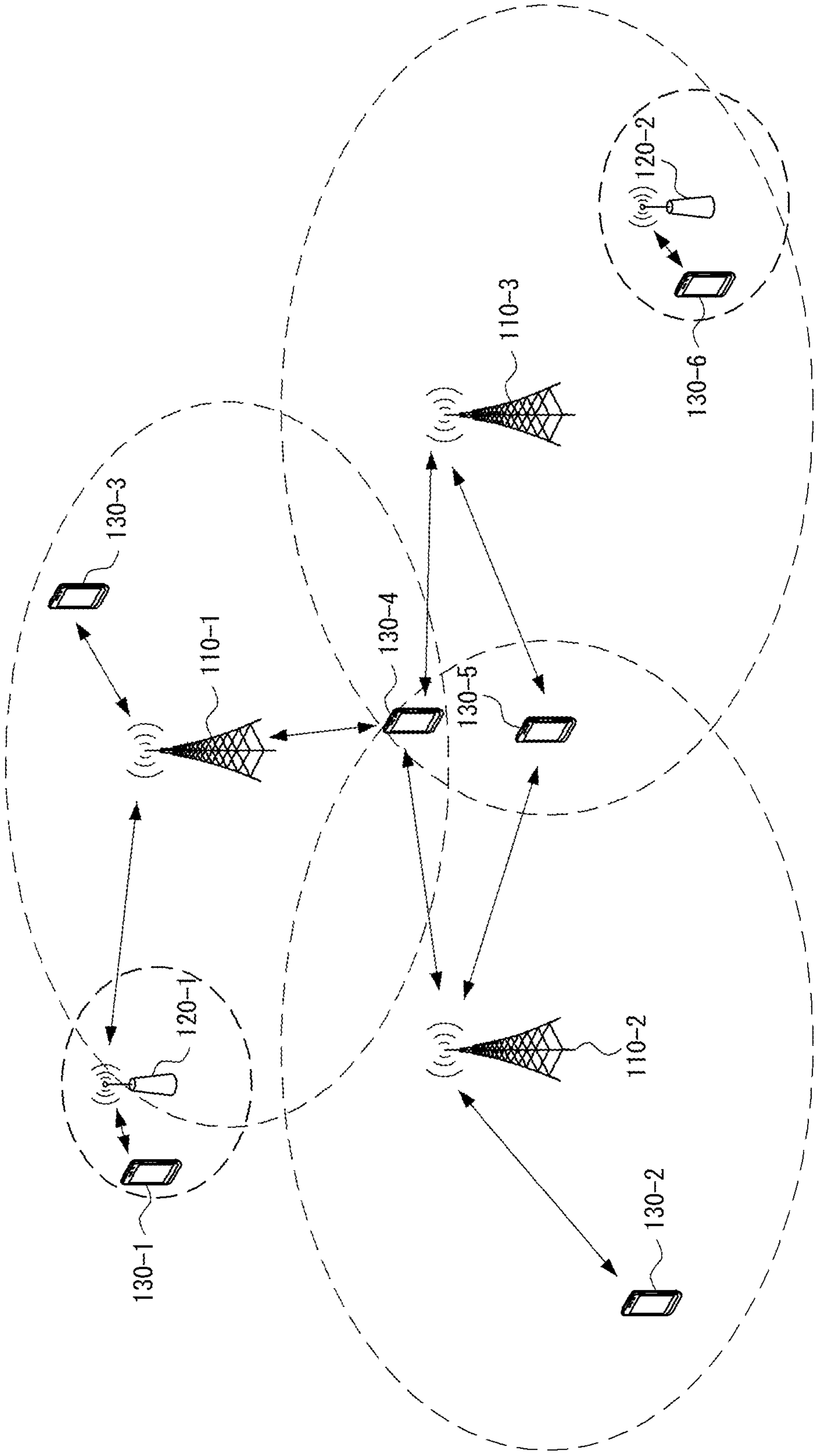
FIG. 1 is a conceptual diagram illustrating an exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g. 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like. Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g. long term evolution (LTE), LTE-advanced (LTE-A)), 5G communication (e.g. new radio (NR)), 6G communication, etc. specified in the 3rd generation partnership project (3GPP) standards. The 4G communication may be performed in frequency bands below 6 GHZ, and the 5G communication may be performed in frequency bands above 6 GHz as well as frequency bands below 6 GHz.

For example, in order to perform the 4G communication, 5G communication, and 6G communication, the plurality of communication may support a code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform spread OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter bank multi-carrier (FBMC) based communication protocol, universal filtered multi-carrier (UFMC) based communication protocol, space division multiple access (SDMA) based communication protocol, orthogonal time-frequency space (OTFS) based communication protocol, or the like.

Further, the communication system 100 may further include a core network. When the communication 100 supports 4G communication, the core network may include a serving gateway (S-GW), packet data network (PDN) gateway (P-GW), mobility management entity (MME), and the like. When the communication system 100 supports 5G communication or 6G communication, the core network may include a user plane function (UPF), session management function (SMF), access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
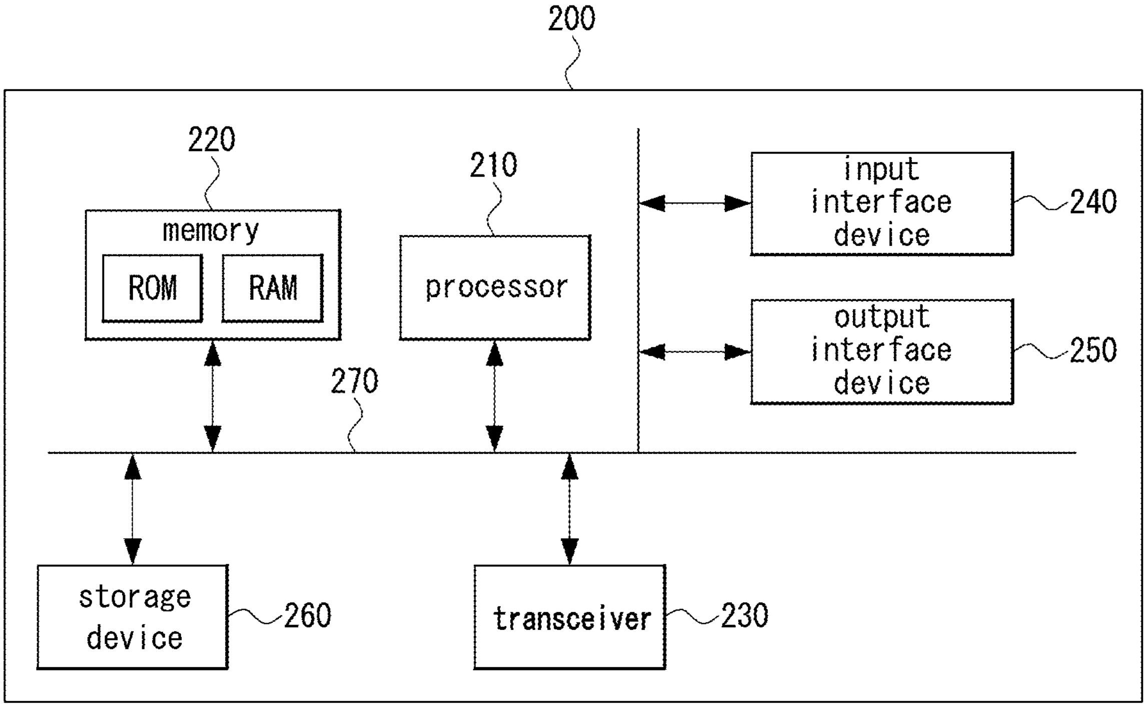
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), evolved Node-B (eNB), gNB, base transceiver station (BTS), radio base station, radio transceiver, access point, access node, road side unit (RSU), radio remote head (RRH), transmission point (TP), transmission and reception point (TRP), or the like.

Each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of Thing (IoT) device, mounted module/device/terminal, on-board device/terminal, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Hereinafter, transmission methods based on LOS MIMO in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

The LOS MIMO technology may be used to transmit and receive signals using a spatial multiplexing scheme in a Line-of-Sight (LOS) channel environment. The spatial multiplexing scheme may be applicable when a path loss is small and a high channel rank is secured, as in environments with rich scattering and numerous unrelated paths between a transmitter (e.g. base station) and a receiver (e.g. terminal). In the case of forming an MIMO channel in the LOS channel environment, the spatial multiplexing scheme may be disadvantageous in terms of transmission performance due to a high correlation among sub-channels. However, when certain conditions are satisfied, such as a distance between a transmitting array (Tx array) antenna and a receiving array (Rx array) antenna, a spacing between elements within the transmitting array antenna, and a spacing between elements within the receiving array antenna, the MIMO channel may be orthogonalized, thereby maximizing transmission performance (e.g. capacity).

Figure 3:
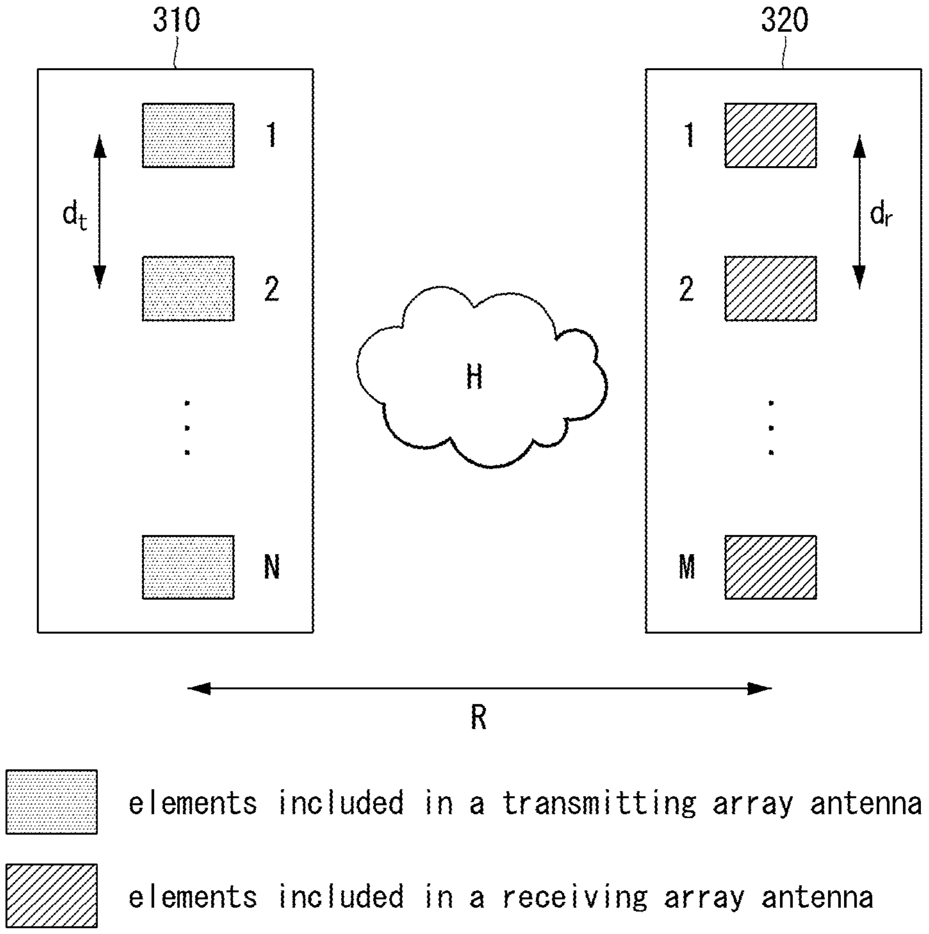
FIG. 3 is a conceptual diagram illustrating transmitting and receiving array antennas in a communication system supporting LOS MIMO.

FIG. 3 is a conceptual diagram illustrating transmitting and receiving array antennas in a communication system supporting LOS MIMO.

Referring to FIG. 3, a transmitting array antenna 310 may refer to an array antenna included in a base station, while a receiving array antenna 320 may refer to an array antenna included in a terminal. The array antenna included in the base station may be configured similarly to the receiving array antenna 320. The transmitting array antenna 310 may have a Uniform Linear Array (ULA) structure comprising N antenna elements (where N is a natural number greater than 1), and the receiving array antenna 320 may have a ULA structure comprising M antenna elements (where M is a natural number greater than 1). $d_t$ may denote a spacing between antenna elements in the transmitting array antenna 310, while $d_r$ may denote a spacing between antenna elements in the receiving array antenna 320. R may denote a distance between the transmitting array antenna 310 and the receiving array antenna 320. H may represent a channel matrix describing an MIMO channel between the base station and the terminal.

As shown in FIG. 3, in the MIMO channel configured with N×M (N≤M) transmitting and receiving array antenna pairs (e.g. ULA antennas), assuming that a waveform of the l-th antenna of the transmitting array antenna is received at the receiving array antenna as a plane wave with an angle $\theta_1$, a vector channel $h_l$ may be expressed as in Equation 1.

$$h_l = \left[\, 1 e^{-2\pi j \sin(\theta_l) d_r/\lambda} \;\ldots\; e^{-2\pi j (M-1)\sin(\theta_l) d_r/\lambda} \,\right]^T \quad \text{[Equation 1]}$$

λ may denote a wavelength of a carrier, M may denote the number of antenna elements in the receiving array antenna, $d_r$ may denote the spacing between antenna elements in the receiving array antenna, and $\theta_l$ may denote an angle at which a waveform of the l-th antenna of the transmitting array antenna is received as a plane wave at the receiving array antenna.

If an inner product between vector channels of arbitrary p-th and q-th antennas (p≠q) among the N×M transmitting and receiving array antenna pairs (e.g. ULA antennas) is zero, the MIMO channel may be orthogonalized, and a channel capacity may be maximized through spatial multiplexing at a high Signal-to-Noise Ratio (SNR). The condition for orthogonalizing the LOS MIMO channel between the N×M transmitting and receiving array antenna pairs may be expressed as in Equation 2.

$$\langle h_p, h_q \rangle = \sum_{m=0}^{M-1} \exp\left(j\frac{2\pi}{\lambda}(\sin(\theta_p) - \sin(\theta_q))md_r\right) = 0,\ \forall\ p \neq q \quad \text{[Equation 2]}$$

A vector channel $h_p$ may denote a channel through which a waveform of the p-th antenna of the transmitting array antenna is received at the receiving array antenna as a plane wave with an angle $\theta_p$. Similarly, a vector channel hg may denote a channel through which a waveform of the q-th antenna of the transmitting array antenna is received at the receiving array antenna as a plane wave with an angle $\theta_g$.

If the distance R between the transmitting array antenna and the receiving array antenna is much greater than the spacing $d_t$ between elements of the transmitting array antenna and the spacing $d_r$ between elements of the receiving array antenna, each of sine terms sin ($\theta_p$) and sin ($\theta_q$) in Equation 2 may be approximated as shown in Equation 3.

$$\sin\theta_l \approx \frac{(l-1)d_t}{R},\ l = 1, 2, \ldots, N \quad \text{[Equation 3]}$$

Substituting Equation 3 into Equation 2, Equation 2 may be expressed as Equation 4.

$$\langle h_p, h_q \rangle = \sum_{m=0}^{M-1} \exp\left(j2\pi(p-q)\frac{md_td_r}{\lambda R}\right) = 0,\ \forall\ p \neq q \quad \text{[Equation 4]}$$

$$\text{If } \exp\left(j\frac{2\pi(p-q)d_td_r}{\lambda R}\right) \neq 1 \left(\text{i.e. } (p-q)\frac{d_td_r}{\lambda R}M \neq \text{integer}\right)$$

in Equation 4, Equation 4 may be expressed as Equation 5.

$$\langle h_p, h_q \rangle = \sum_{m=0}^{M-1} \exp\left(j2\pi(p-q)\frac{md_td_r}{\lambda R}\right) = \frac{1 - \exp\left(j\frac{2\pi(p-q)d_td_r}{\lambda R}M\right)}{1 - \exp\left(j\frac{2\pi(p-q)d_td_r}{\lambda R}\right)} = 0,\ \forall\ p \neq q \quad \text{[Equation 5]}$$

For Equation 5 to be satisfied, $d_t$, $d_r$, and R need to satisfy $$(p-q)\frac{d_td_r}{\lambda R}M = \text{integer.}$$

This is expressed as Equation 6:

$$\frac{d_td_r}{\lambda R}M = k,\ k = 1, 2, 3, \ldots$$

If k=1 in Equation 6, $d_t$ and $d_r$ may take their minimum values, and the size of the antennas may also be minimized. Additionally, the condition of $$(p-q)\frac{d_td_r}{\lambda R}M \neq \text{integer}$$

satisfied. Therefore, k=1 may be generally used.

In the LOS MIMO channels formed between N×M transmitting and receiving array antenna pairs (e.g. ULA antennas), Equation 6 may be transformed into Equation 7. Equations 6 and 7 may then be expressed as Equation 8, where N may be greater than M (N>M).

$$\frac{d_td_r}{\lambda R}N = 1 \quad \text{[Equation 7]}$$

$$d_td_r = k\lambda R/\max(N, M) \quad \text{[Equation 8]}$$

Once $d_t$ and $d_r$ are determined, the distance R at which the MIMO channel becomes orthogonal may be determined. In other words, if the orthogonal channel distance R for the MIMO system is determined first, $d_t$ and $d_r$ may be determined according to R.

Figure 4:
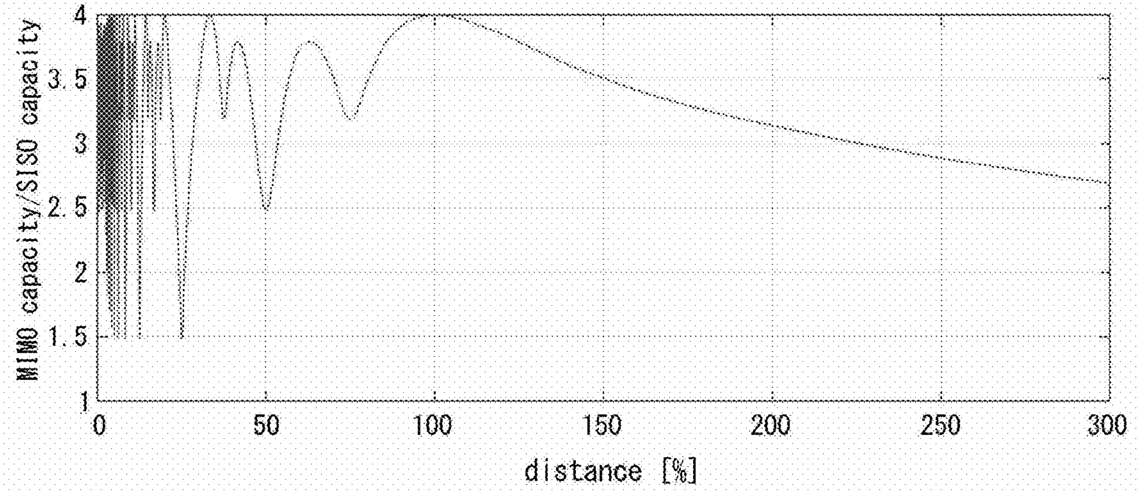
FIG. 4 is a first graph illustrating a normalized capacity when 4×4 array antennas are used in a communication system supporting LOS MIMO.

FIG. 4 is a first graph illustrating a normalized capacity when 4×4 array antennas are used in a communication system supporting LOS MIMO.

Referring to FIG. 4, SNR may be assumed to remain the same regardless of a distance between a transmitter (e.g. transmitting array antenna) and a receiver (e.g. receiving array antenna). The y-axis represents a value of an MIMO capacity relative to a Single-Input and Single-Output (SISO) capacity under the same SNR, while the x-axis represents a distance between the transmitter and the receiver, expressed as a percentage (%). On the x-axis, 100% indicates an optimal distance between the transmitter and the receiver, which corresponds to a distance that achieves the maximum MIMO capacity.

The graph shown in FIG. 4 illustrates values of the MIMO capacity relative to the SISO capacity obtained by varying the distance between the transmitting array antenna and the receiving array antenna, without changing a spacing between elements included in the transmitting and receiving array antennas, based on a distance corresponding to 100%. There may exist multiple distances within a range corresponding to 100% where the MIMO capacity is four times greater than the SISO capacity. The minimum value of the MIMO capacity relative to the SISO capacity may be 1.5, and at a distance corresponding to 50%, the value of the MIMO capacity relative to the SISO capacity may be 2.5. The value of the MIMO capacity relative to the SISO capacity may gradually decrease as the distance increases from 100% to 300%. When designing a communication system using 4×4 array antennas, it may be advantageous to design the array antennas such that the communication range falls within 100% to 300%.

At the distance corresponding to 50%, the MIMO capacity relative to the SISO capacity may decrease sharply, and the value may remain low in a relatively wide region (e.g. a region around 50%). In the communication system supporting LOS MIMO, the spacing between elements included in the array antennas of the base station and terminal may be fixed. Consequently, as the terminal moves, there may be regions where the MIMO capacity (e.g. the value of the MIMO capacity relative to the SISO capacity) significantly decreases, and the communication system needs to be designed to minimize such capacity decrease.

To achieve MIMO capacity at various distances, the transmitting node (e.g. base station) may perform precoding by applying Singular Value Decomposition (SVD) to the MIMO channel. The receiving node (e.g. terminal) may use an MIMO receiver corresponding to the MIMO channel. The transmitting node needs to accurately know the MIMO channel, which may be challenging due to increased feedback information. In a mobile communication environment, the MIMO channel may vary. Even if the transmitting node receives accurate feedback about the MIMO channel from the receiving node, the MIMO channel may vary by a transmission time, leading to a degradation in the transmission performance of the transmitting node. To address this issue, in general MIMO communication systems, the transmitting node receives only limited channel information as feedback from the receiving node and performs MIMO precoding using the feedback information.

The present disclosure proposes a method for generating a codebook suitable for MIMO transmission systems in LOS channel environments and the codebook. Before describing the proposals of the present disclosure, MIMO transmission and reception in a communication system will be described.

Figure 5:
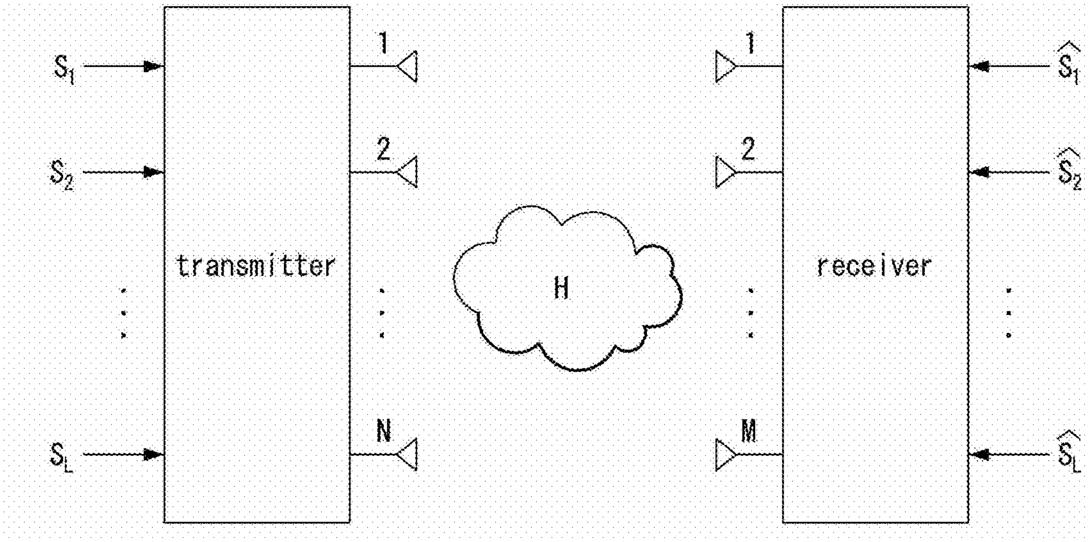
FIG. 5 is a conceptual diagram illustrating a communication system supporting MIMO according to an exemplary embodiment of the present disclosure.

FIG. 5 is a conceptual diagram illustrating a communication system supporting MIMO according to an exemplary embodiment of the present disclosure.

Referring to FIG. 5, a communication system supporting MIMO may include a transmitting node and a receiving node. The transmitting node may include N antenna elements, where N is a natural number greater than 1, and the receiving node may include M antenna elements, where M is a natural number greater than 1. The transmitting node may transmit L independent streams, where L is a natural number greater than 1, by generating transmission signals corresponding to the MIMO channel matrix H through precoding and transmitting the signals to the receiving node using multiple antennas. The receiving node may restore the original signals for the respective streams received as a mixture through multiple antennas by using an MIMO receiver. The precoding may be expressed in the form of an N×L matrix for the number L of streams (layers) to be transmitted and the N transmitting antenna elements. The transmitting node and the receiving node may be configured in the same or similar manner as the communication nodes shown in FIG. 2.

Hereinafter, a codebook suitable for LOS MIMO channel proposed in the present disclosure will be described. In the LOS MIMO channel, a terminal may provide feedback to a base station with a precoding codebook index that changes according to the movement of the terminal. The base station may perform precoding for transmission signals using the feedbacked precoding codebook index and transmit precoded signals to the terminal. In the present disclosure, a codebook suitable for LOS MIMO channel is proposed for a transmission system with four or eight transmitting antenna elements.

In the present disclosure, a method for generating a codebook for LOS MIMO channel may use a channel matrix H at a distance where the MIMO channel becomes orthogonal as a precoding matrix. For example, a precoding matrix for transmitting signals in L layers may assume an N×L LOS MIMO system where the number of receiving antenna elements is L. A precoding matrix P may be expressed as shown in Equation 9 using the channel matrix H at a point where the MIMO channel is orthogonal.

$$P = \frac{1}{\sqrt{N}} \cdot \frac{1}{\sqrt{L}} \cdot H^H \quad \text{[Equation 9]}$$

Here, P may denote the precoding matrix, and $H^H$ may denote a Hermitian transpose of the channel matrix H. N, where N is a natural number greater than 1, may denote the number of transmitting antenna elements, and L, where L is a natural number greater than 1, may denote the number of receiving antenna elements.

The precoding matrix $P=[p_1\ p_2\ \ldots\ p_L]$ configured as shown in Equation 9 may have the following properties.

The elements of vector $p_{1+k}$ and vector $p_{L-k}$ ($k=0, 1, \ldots, \lceil L/2 \rceil-1$) may be symmetric. In other words, if the elements of $p_{1+k}$ are defined as $p_{1+k}=[v_1\ v_2 \ldots v_{N-1}\ v_N]^T$, the elements of $p_{L-k}$ may be defined as $p_{L-k}=[v_N\ v_{N-1} \ldots v_2\ v_1]$ T.

If L is odd, the elements of vector $p_{\lceil L/2 \rceil}$ may be symmetric. In other words, if the elements of $p_{\lceil L/2 \rceil}$ are defined as $p_{\lceil L/2 \rceil}=[v_1\ v_2\ \ldots\ v_{N-1}\ v_N]^T$, $v_1=v_N$, $v_2=v_{N-1}$, . . . , $v_{\lceil L/2 \rceil - 1} = v_{\lceil L/2 \rceil + 1}$ may be established. $p_{\lceil L/2 \rceil}$ may be a middle precoding vector among the L precoding vectors $p_1\ p_2 \ldots p_L$.

In the present disclosure, a precoding matrix for four transmitting antenna elements (hereinafter referred to as 4×L precoding matrix) may be proposed. The phase values used in the 4×L precoding matrix may be represented as shown in Table 1, where L may represent the number of layers.

TABLE 1

| layers | $\text{Ø}_1$ | $\text{Ø}_2$ | $\text{Ø}_3$ | $\text{Ø}_4$ |
|---|---|---|---|---|
| 2 | 0.5641 | −0.6859 | | |
| | 0.0141 | 0.2641 | | |
| | 0.2641 | 0.0141 | | |
| | −0.6859 | 0.5641 | | |
| 3 | 0.3062 | 0.9000 | −0.1938 | |
| | 0.0062 | 0.1000 | 0.5062 | |
| | 0.5062 | 0.1000 | 0.0062 | |
| | −0.1938 | 0.9000 | 0.3062 | |

In Table 1, for four transmitting antenna elements, the precoding codebook may include a precoding matrix for two independent streams (layers) (i.e. 4×2 precoding matrix, hereinafter referred to as 'precoding matrix #1_1') and a precoding matrix for three independent streams (i.e. 4×3 precoding matrix, hereinafter referred to as 'precoding matrix #1_2'). The precoding matrix #1_1 may include two phase vectors $\text{Ø}_1$ and $\text{Ø}_2$ and the precoding matrix #1_2 may include three phase vectors $\text{Ø}_1$, $\text{Ø}_2$, and $\text{Ø}_3$.

In the precoding matrix #1_1, the phase vectors $\text{Ø}_1$ and $\text{Ø}_2$ may each include four elements, and the elements of the phase vector $\text{Ø}_1$ and the elements of the phase vector $\text{Ø}_2$ may be symmetric. The first element $\text{Ø}_4[1]$ of phase vector $\text{Ø}_1$ and the fourth element $\text{Ø}_2[4]$ of phase vector $\text{Ø}_2$ may have the same value ($\text{Ø}_1[1]=\text{Ø}_2[4]=0.5641$). The second element $\text{Ø}_1[2]$ of the phase vector $\text{Ø}_1$ and the third element $\text{Ø}_2[3]$ of the phase vector $\text{Ø}_2$ may have the same value ($\text{Ø}_1[2]=\text{Ø}_2[3]=0.0141$). The third element 04[3] of the phase vector $\text{Ø}_1$ and the second element $\text{Ø}_2$ [2] of the phase vector $\text{Ø}_2$ may have the same value ($\text{Ø}_1[3]=\text{Ø}_2[2]=0.2641$). The fourth element $\text{Ø}_1[4]$ of the phase vector $\text{Ø}_1$ and the first element $\text{Ø}_2[1]$ of the phase vector $\text{Ø}_2$ may have the same value ($\text{Ø}_1[4]=\text{Ø}_2[1]=-0.6859$).

In the precoding matrix #1_2, the phase vectors $\text{Ø}_1$, $\text{Ø}_2$, and $\text{Ø}_3$ may each include four elements, and the elements of the phase vector $\text{Ø}_1$ and the elements of the phase vector $\text{Ø}_3$ may be symmetric. Among the three phase vectors $\text{Ø}_1$, $\text{Ø}_2$, and $\text{Ø}_3$, the elements included in the middle phase vector $\text{Ø}_2$ may be symmetric. In the phase vector $\text{Ø}_2$, the first element $\text{Ø}_2[1]$ and the fourth element $\text{Ø}_2[4]$ may have the same value ($\text{Ø}_2[1]=\text{Ø}_2[4]=0.9000$). The second element $\text{Ø}_2$ [2] and the third element $\text{Ø}_2$ [3] may have the same value ($\text{Ø}_2[2]=\text{Ø}_2[3]=0.1000$).

In the present disclosure, a precoding matrix for eight transmitting antenna elements (hereinafter referred to as '8×L precoding matrix') may be proposed. The phase values used in the 8×L precoding matrix may be represented as shown in Tables 2 through 7.

TABLE 2

| layers | $\text{Ø}_1$ | $\text{Ø}_2$ | $\text{Ø}_3$ | $\text{Ø}_4$ | $\text{Ø}_5$ | $\text{Ø}_6$ | $\text{Ø}_7$ |
|---|---|---|---|---|---|---|---|
| 2 | 0.4722 | −0.6528 | | | | | |
| | 0.1973 | −1.1778 | | | | | |
| | 0.7223 | −0.9027 | | | | | |
| | 0.0473 | 0.1723 | | | | | |
| | 0.1723 | 0.0473 | | | | | |
| | −0.9027 | 0.7223 | | | | | |
| | −1.1778 | 0.1973 | | | | | |
| | −0.6528 | 0.4722 | | | | | |

In Table 2, for eight transmitting antenna elements, the precoding codebook may include a precoding matrix for two independent streams (layers) (i.e. 8×2 precoding matrix, hereinafter referred to as 'precoding matrix #2_1'). The precoding matrix #2_1 may include two phase vectors $\text{Ø}_1$ and $\text{Ø}_2$. In the precoding matrix #2_1, the phase vectors $\text{Ø}_1$ and $\text{Ø}_2$ may each include eight elements, and the elements of the phase vector $\text{Ø}_1$ and the elements of the phase vector $\text{Ø}_2$ may be symmetric.

TABLE 3

| layers | $\text{Ø}_1$ | $\text{Ø}_2$ | $\text{Ø}_3$ | $\text{Ø}_4$ | $\text{Ø}_5$ | $\text{Ø}_6$ | $\text{Ø}_7$ |
|---|---|---|---|---|---|---|---|
| 3 | 0.0640 | 0.8999 | −0.1860 | | | | |
| | −0.0859 | 0.5000 | −0.8360 | | | | |
| | 0.5641 | 0.9000 | −0.6859 | | | | |
| | 0.0141 | 0.1000 | 0.2641 | | | | |
| | 0.2641 | 0.1000 | 0.0141 | | | | |
| | −0.6859 | 0.9000 | 0.5641 | | | | |
| | −0.8360 | 0.5000 | −0.0859 | | | | |
| | −0.1860 | 0.8999 | 0.0640 | | | | |

In Table 3, for eight transmitting antenna elements, the precoding codebook may include a precoding matrix for three independent streams (layers) (i.e. 8×3 precoding matrix, hereinafter referred to as 'precoding matrix #2_2'). The precoding matrix #2_2 may include three phase vectors $\text{Ø}_1$, $\text{Ø}_2$, and $\text{Ø}_3$. In the precoding matrix #2_2, the phase vectors $\text{Ø}_1$, $\text{Ø}_2$, and $\text{Ø}_3$ may each include eight elements, and the elements of the phase vector $\text{Ø}_1$ and the elements of the phase vector $\text{Ø}_3$ may be symmetric. Additionally, among the three phase vectors $\text{Ø}_1$, $\text{Ø}_2$, and $\text{Ø}_3$, the elements included in the middle phase vector $\text{Ø}_2$ may be symmetric.

TABLE 4

| layers | $\text{Ø}_1$ | $\text{Ø}_2$ | $\text{Ø}_3$ | $\text{Ø}_4$ | $\text{Ø}_5$ | $\text{Ø}_6$ | $\text{Ø}_7$ |
|---|---|---|---|---|---|---|---|
| 4 | −0.3246 | 0.4722 | −0.6528 | 0.3003 | | | |
| | −0.3496 | 0.1973 | −1.1778 | −0.4746 | | | |
| | 0.4254 | 0.7223 | −0.9027 | −0.4496 | | | |
| | 0.0004 | 0.0473 | 0.1723 | 0.3754 | | | |
| | 0.3754 | 0.1723 | 0.0473 | 0.0004 | | | |
| | −0.4496 | −0.9027 | 0.7223 | 0.4254 | | | |
| | −0.4746 | −1.1778 | 0.1973 | −0.3496 | | | |
| | 0.3003 | −0.6528 | 0.4722 | −0.3246 | | | |

In Table 4, for eight transmitting antenna elements, the precoding codebook may include a precoding matrix for four independent streams (layers) (i.e. 8×4 precoding matrix, hereinafter referred to as 'precoding matrix #2_3'). The precoding matrix #2_3 may include four phase vectors $\text{Ø}_1$, $\text{Ø}_2$, $\text{Ø}_3$, and $\text{Ø}_4$. In precoding matrix #2_3, the phase vectors $\text{Ø}_1$, $\text{Ø}_2$, $\text{Ø}_3$, and $\text{Ø}_4$ may each include eight elements. The elements of the phase vector $\text{Ø}_1$ and the elements of the phase vector $\text{Ø}_4$ may be symmetric, and the elements of the phase vector $\text{Ø}_2$ and the elements of the phase vector $\text{Ø}_3$ may also be symmetric.

TABLE 5

| layers | $\emptyset_1$ | $\emptyset_2$ | $\emptyset_3$ | $\emptyset_4$ | $\emptyset_5$ | $\emptyset_6$ | $\emptyset_7$ |
|---|---|---|---|---|---|---|---|
| 5 | −0.6938 | 0.0640 | 0.8999 | −0.1860 | 0.8061 | | |
| | −0.5938 | −0.0859 | 0.5000 | −0.8360 | −0.0938 | | |
| | 0.3062 | 0.5641 | 0.9000 | −0.6859 | −0.1938 | | |
| | 0.0062 | 0.0141 | 0.1000 | 0.2641 | 0.5062 | | |
| | 0.5062 | 0.2641 | 0.1000 | 0.0141 | 0.0062 | | |
| | −0.1938 | −0.6859 | 0.9000 | 0.5641 | 0.3062 | | |
| | −0.0938 | −0.8360 | 0.5000 | −0.0859 | −0.5938 | | |
| | 0.8061 | −0.1860 | 0.8999 | 0.0640 | −0.6938 | | |
| | −0.6938 | 0.0640 | 0.8999 | −0.1860 | 0.8061 | | |

In Table 5, for eight transmitting antenna elements, the precoding codebook may include a precoding matrix for five independent streams (layers) (i.e. 8×5 precoding matrix, hereinafter referred to as 'precoding matrix #2_4'). The precoding matrix #2_4 may include five phase vectors $\emptyset_1$, $\emptyset_2$, $\emptyset_3$, $\emptyset_4$, and $\emptyset_5$. In the precoding matrix #2_4, the phase vectors $\emptyset_1$, $\emptyset_2$, $\emptyset_3$, $\emptyset_4$, and $\emptyset_5$ may each include eight elements. The elements of the phase vector $\emptyset_1$ and the elements of the phase vector $\emptyset_5$ may be symmetric, and the elements of the phase vector $\emptyset_2$ and the elements of the phase vector $\emptyset_4$ may also be symmetric. Additionally, among the five phase vectors $\emptyset_1$, $\emptyset_2$, $\emptyset_3$, $\emptyset_4$, and $\emptyset_5$, the elements included in the middle phase vector $\emptyset_3$ may be symmetric.

TABLE 6

| layers | $\emptyset_1$ | $\emptyset_2$ | $\emptyset_3$ | $\emptyset_4$ | $\emptyset_5$ | $\emptyset_6$ | $\emptyset_7$ |
|---|---|---|---|---|---|---|---|
| 6 | 0.9566 | −0.3246 | 0.4722 | −0.6528 | 0.3003 | −0.6685 | |
| | 1.1816 | −0.3496 | 0.1973 | −1.1778 | −0.4746 | 0.3066 | |
| | 2.2066 | 0.4254 | 0.7223 | −0.9027 | −0.4496 | 0.0816 | |
| | 2.0316 | 0.0004 | 0.0473 | 0.1723 | 0.3754 | 0.6566 | |
| | 2.6566 | 0.3754 | 0.1723 | 0.0473 | 0.0004 | 0.0316 | |
| | 2.0816 | −0.4496 | −0.9027 | 0.7223 | 0.4254 | 0.2066 | |
| | 2.3066 | −0.4746 | −1.1778 | 0.1973 | −0.3496 | −0.8184 | |
| | 1.3315 | 0.3003 | −0.6528 | 0.4722 | −0.3246 | −1.0434 | |

In Table 6, for eight transmitting antenna elements, the precoding codebook may include a precoding matrix for six independent streams (layers) (i.e. 8×6 precoding matrix, hereinafter referred to as 'precoding matrix #2_5'). The precoding matrix #2_5 may include six phase vectors $\emptyset_1$, $\emptyset_2$, $\emptyset_3$, $\emptyset_4$, $\emptyset_5$, and $\emptyset_6$. In the precoding matrix #2_5, the phase vectors $\emptyset_1$, $\emptyset_2$, $\emptyset_3$, $\emptyset_4$, $\emptyset_5$, and $\emptyset_6$ may each include eight elements. The elements of the phase vector $\emptyset_1$ and the elements of the phase vector $\emptyset_6$ may be symmetric, the elements of the phase vector $\emptyset_2$ and the elements of the phase vector $\emptyset_5$ may be symmetric, and the elements of the phase vector $\emptyset_3$ and the elements of the phase vector $\emptyset_4$ may also be symmetric.

TABLE 7

| layers | $\emptyset_1$ | $\emptyset_2$ | $\emptyset_3$ | $\emptyset_4$ | $\emptyset_5$ | $\emptyset_6$ | $\emptyset_7$ |
|---|---|---|---|---|---|---|---|
| 7 | 0.6265 | −0.6938 | 0.0640 | 0.8999 | −0.1860 | 0.8061 | −0.1236 |
| | 0.9766 | −0.5938 | −0.0859 | 0.5000 | −0.8360 | −0.0938 | 0.7265 |
| | 0.1266 | 0.3062 | 0.5641 | 0.9000 | −0.6859 | −0.1938 | 0.3765 |
| | 0.0766 | 0.0062 | 0.0141 | 0.1000 | 0.2641 | 0.5062 | 0.8266 |
| | 0.8266 | 0.5062 | 0.2641 | 0.1000 | 0.0141 | 0.0062 | 0.0766 |
| | 0.3765 | −0.1938 | −0.6859 | 0.9000 | 0.5641 | 0.3062 | 0.1266 |
| | 0.7265 | −0.0938 | −0.8360 | 0.5000 | −0.0859 | −0.5938 | 0.9766 |
| | −0.1236 | 0.8061 | −0.1860 | 0.8999 | 0.0640 | −0.6938 | 0.6265 |

In Table 7, for eight transmitting antenna elements, the precoding codebook may include a precoding matrix for seven independent streams (layers) (i.e. 8×7 precoding matrix, hereinafter referred to as 'precoding matrix #2_6'). The precoding matrix #2_6 may include seven phase vectors $\emptyset_1$, $\emptyset_2$, $\emptyset_3$, $\emptyset_4$, $\emptyset_5$, $\emptyset_6$, and $\emptyset_7$. In the precoding matrix #2_6, the phase vectors $\emptyset_1$, $\emptyset_2$, $\emptyset_3$, $\emptyset_4$, $\emptyset_5$, $\emptyset_6$, and $\emptyset_7$ may each include eight elements. The elements of the phase vector $\emptyset_1$ and the elements of the phase vector $\emptyset_7$ may be symmetric, the elements of the phase vector $\emptyset_2$ and the elements of the phase vector $\emptyset_6$ may be symmetric, and the elements of the phase vector $\emptyset_3$ and the elements of the phase vector $\emptyset_5$ may also be symmetric. Among the seven phase vectors $\emptyset_1$, $\emptyset_2$, $\emptyset_3$, $\emptyset_4$, $\emptyset_5$, $\emptyset_6$, and $\emptyset_7$, the elements included in the middle phase vector $\emptyset_4$ may be symmetric.

The precoding matrix for transmitting signals in L layers may be expressed as shown in Equation 10 using the phase vectors in Tables 1 through 7.

[Equation 10]

$$P = \frac{1}{\sqrt{N}} \cdot \frac{1}{\sqrt{L}} \cdot [\exp(j \cdot \pi \cdot \phi_1)\ \ \exp(j \cdot \pi \cdot \phi_2)\ \ \ldots\ \ \exp(j \cdot \pi \cdot \phi_L)]$$

Figure 6:
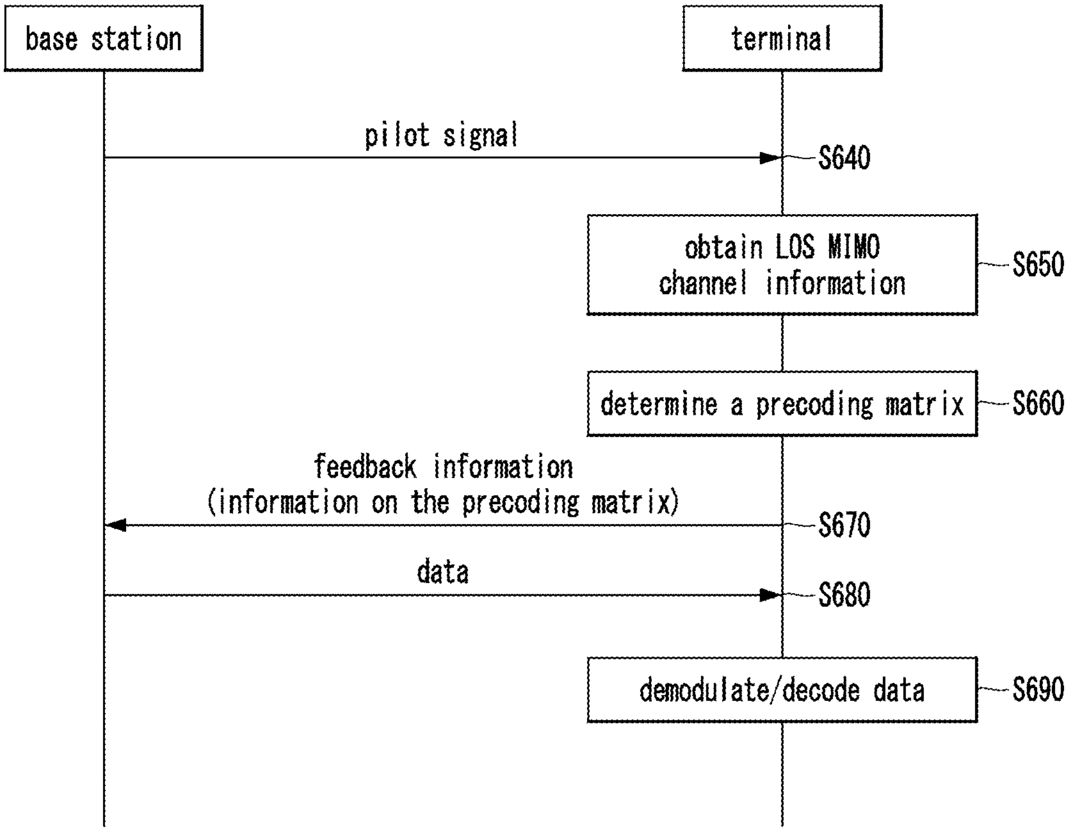
FIG. 6 is a sequence chart illustrating a transmission and reception method in a communication system supporting LOS MIMO according to an exemplary embodiment of the present disclosure.

FIG. 6 is a sequence chart illustrating a transmission and reception method in a communication system supporting LOS MIMO according to an exemplary embodiment of the present disclosure.

Referring to FIG. 6, a communication system supporting LOS MIMO may include a base station and a terminal. The base station may correspond to the base stations 110-1, 110-2, 110-3, 120-1, and 120-2 shown in FIG. 1, and the terminal may correspond to the terminals 130-1, 130-2, 130-3, 130-4, 130-5, and 130-6 shown in FIG. 1. The base station and the terminal may be configured identically or similarly to the communication node 200 shown in FIG. 2. The base station may include the transmitting array antenna 310 shown in FIG. 3, and the terminal may include the receiving array antenna 320 shown in FIG. 3. The transmitting array antenna may be a ULA antenna including N elements, and the receiving array antenna may be a ULA antenna including L elements. Accordingly, an N×L LOS MIMO channel may be assumed.

In FIG. 6, the base station may obtain a channel matrix or multiple phase vectors based on predetermined LOS MIMO channel configuration information. The obtained channel matrix or multiple phase vectors may be a channel matrix or multiple phase vectors corresponding to a distance at which the LOS MIMO channel becomes orthogonal. Each of the N elements included in the transmitting array antenna may be arranged at a first spacing $d_t$, and each of the L elements included in the receiving array antenna may be arranged at a second spacing $d_r$. The first spacing and the second spacing may be determined by the orthogonal distance R of the LOS MIMO channel, as previously mentioned.

The base station may determine a precoding matrix that satisfies a first condition and a second condition using the channel matrix or multiple phase vectors. The precoding matrix P may be calculated using a Hermitian transpose of the channel matrix H. For example, the precoding matrix P may be expressed using the channel matrix H as shown in Equation 9. As another example, the precoding matrix P may be calculated using L phase vectors $\emptyset_1$, $\emptyset_2$, . . . , and $\emptyset_L$. The precoding matrix P may be expressed using L phase vectors $\emptyset_1$, $\emptyset_2$, . . . , and $\emptyset_L$ as shown in Equation 10.

The precoding matrix may include L precoding vectors. The precoding matrix may be represented as shown in Equation 11. If the elements of the first precoding vector and the elements of the second precoding vector among the L precoding vectors are symmetric, the first condition may be satisfied. L may be a natural number greater than or equal to 2. The first precoding vector and the second precoding vector may each be expressed as shown in Equation 12. If L is odd and the elements of a middle precoding vector among the L precoding vectors are symmetric, the second condition may be satisfied. The middle precoding vector may be expressed as shown in Equation 13.

$$P = [\,p_1 \;\; p_2 \;\; \cdots \;\; p_L\,] \quad \text{[Equation 11]}$$

P may denote the precoding matrix, and each of $p_1$ $p_2$ . . . $p_L$ may represent the precoding vector.

$$p_{1+k} = [\,v_1 \;\; v_2 \;\; \ldots \;\; v_{N-1} \;\; v_N\,]^T, \quad \text{[Equation 12]}$$
$$p_{L-k} = [\,v_N \;\; v_{N-1} \;\; \ldots \;\; v_2 \;\; v_1\,]^T \;\; (k = 0, 1, \ldots , \lceil L/2 \rceil - 1)$$

$p_1$+k may denote the first precoding vector, and $p_{L-k}$ may denote the second precoding vector. $\lceil x \rceil$ may represent the smallest integer greater than or equal to x.

$$p_{L-k} = [\,v_N \;\; v_{N-1} \;\; \ldots \;\; v_2 \;\; v_1\,]^T \quad \text{[Equation 13]}$$
$$v_1 = v_N,\, v_2 = v_{N-1},\, \ldots ,\, v_{\lceil L/2 \rceil -1} = v_{\lceil L/2 \rceil +1}$$

P$\lceil L/2 \rceil$ may denote the middle precoding vector, and $\lfloor x \rfloor$ may represent the largest integer less than or equal to x.

In step S640, the base station may transmit a pilot signal to the terminal using the transmitting array antenna. The terminal may receive the pilot signal from the base station using the receiving array antenna.

The base station may generate the pilot signal. The pilot signal may be used to estimate the LOS MIMO channel between the base station and the terminal. For example, the pilot signal may be a reference signal (RS). The reference signal may include at least one of a channel state information-reference signal (CSI-RS), demodulation-reference signal (DM-RS), phase tracking-reference signal (PT-RS), or positioning reference signal (PRS).

In step S650, the terminal may perform an operation to estimate the LOS MIMO channel between the base station and the terminal based on the received pilot signal, thereby obtaining LOS MIMO channel information.

In step S660, the terminal may determine a precoding matrix included in a codebook based on the LOS MIMO channel information obtained in step S650. The codebook may include two or more precoding matrixes that satisfy the first condition and the second condition. As described above, if the precoding matrix includes L precoding vectors, and elements of a first precoding vector and elements of a second precoding vector are symmetric among the L precoding vectors, the first condition may be satisfied. Additionally, if L is odd and elements of the middle precoding vector among the L precoding vectors are symmetric, the second condition may be satisfied.

In step S670, the terminal may transmit feedback information to the base station, and the base station may receive the feedback information from the terminal. The feedback information may include information on the precoding matrix determined in step S660. The information on the precoding matrix may correspond to a precoding matrix index (PMI).

In step S680, the base station may perform beamforming based on the feedback information received from the terminal in step S670 to transmit data to the terminal. The terminal may receive the data from the base station. The feedback information, as mentioned earlier, may include information on the precoding matrix.

The base station may identify the precoding matrix included in the codebook using the feedback information received from the terminal. Based on the precoding matrix included in the codebook, the base station may perform beamforming to transmit the data to the terminal. The precoding matrix may be determined using the channel matrix obtained in step S610.

In the transmission and reception method of the communication system supporting LOS MIMO as described above, steps S610 through S690 have been individually described. However, this does not limit the order in which the steps are performed. If necessary, the steps may be performed simultaneously, in a different order, or combined.

In the transmission and reception method of the communication system supporting LOS MIMO described above, the description focused on downlink, where the base station transmits data. However, the present disclosure is not limited thereto, and the described transmission and reception method may also be applied to uplink, where the terminal transmits data.

Figure 7A:
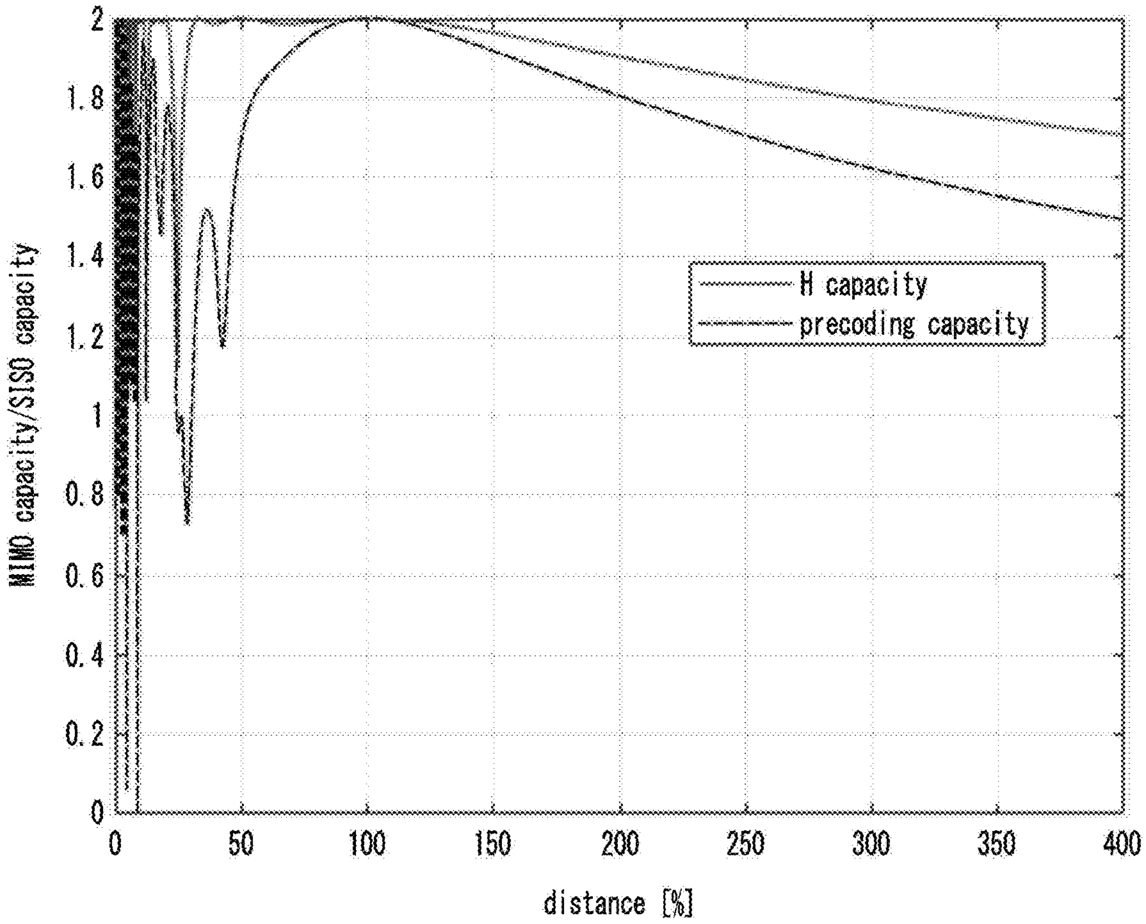
FIG. 7A is a first graph illustrating simulation results for a case where four transmitting antenna elements are used according to the present disclosure.
Figure 7B:
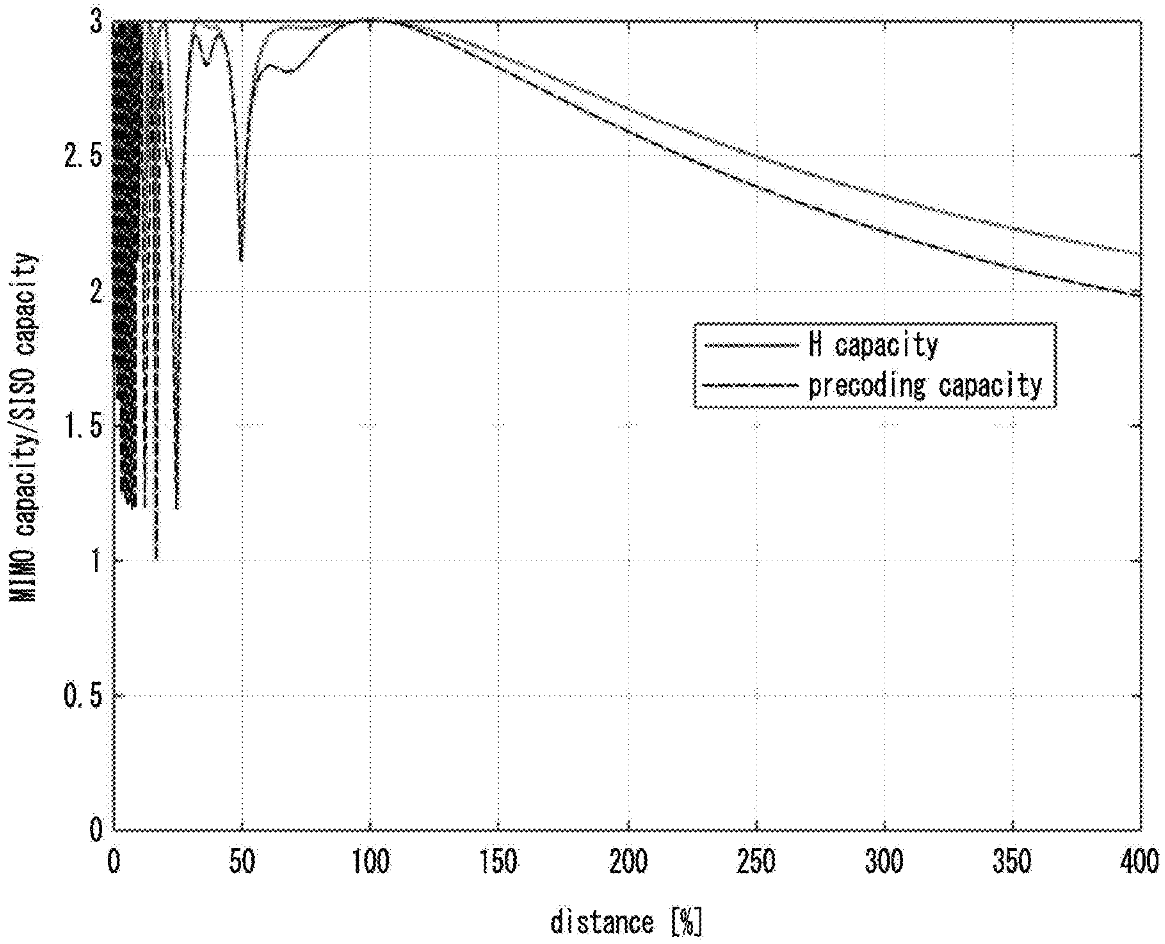
FIG. 7B is a second graph illustrating simulation results for a case where four transmitting antenna elements are used according to the present disclosure.

FIG. 7A is a first graph illustrating simulation results for a case where four transmitting antenna elements are used according to the present disclosure, and FIG. 7B is a second graph illustrating simulation results for a case where four transmitting antenna elements are used according to the present disclosure.

Referring to FIGS. 7A and 7B, SNR is assumed to remain constant regardless of the distance between the transmitter (e.g. transmitting array antenna) and the receiver (e.g. receiving array antenna). The y-axis represents a value of the MIMO capacity relative to the SISO capacity under the same SNR. The x-axis represents the distance between the transmitter and the receiver, expressed as a percentage (%). On the x-axis, 100% represents the optimal distance between the transmitter and the receiver, which corresponds to the distance achieving the maximum MIMO capacity. ‘H capacity’ represents an ideal channel capacity for the channel matrix H, while ‘precoding capacity’ represents a channel capacity for the channel matrix H when the codebook proposed in the present disclosure is applied.

In FIG. 7A, a performance comparison is shown for the case where the 4×2 MIMO codebook proposed in the present disclosure is applied. In FIG. 7B, a performance comparison is shown for the case where the 4×3 MIMO codebook proposed in the present disclosure is applied. It can be seen that as the number of layers increases, the difference between ‘precoding capacity’ and ‘H capacity’ decreases.

Figure 8A:
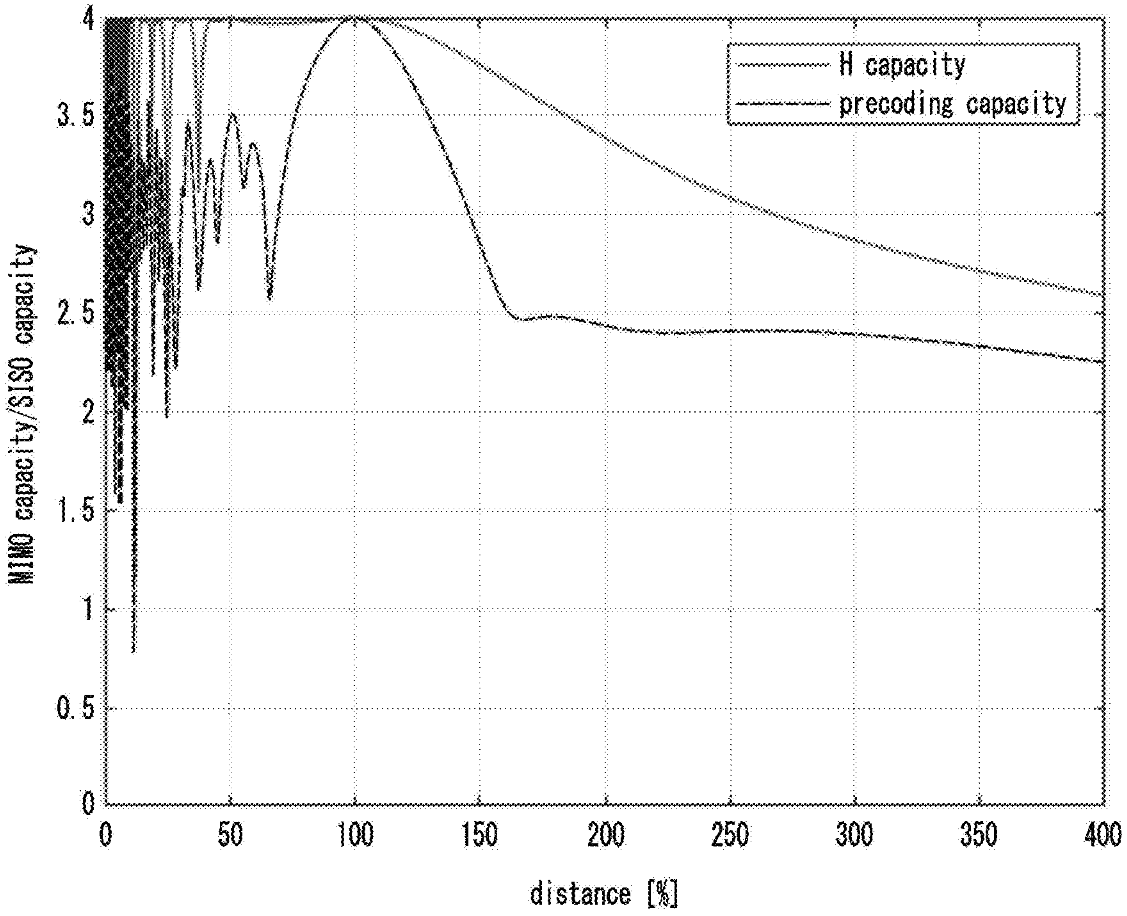
FIG. 8A is a first graph illustrating simulation results for the case where eight transmitting antenna elements are used according to the present disclosure.
Figure 8B:
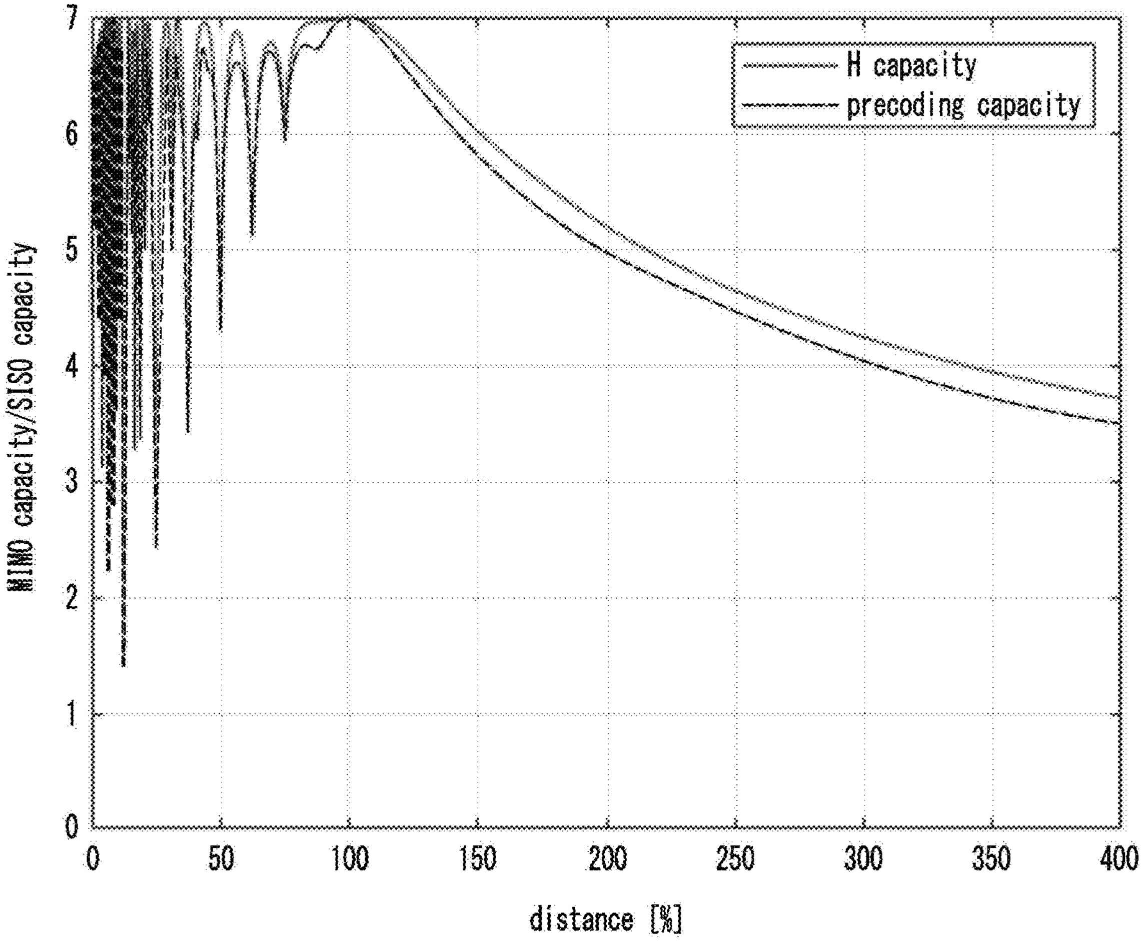
FIG. 8B is a second graph illustrating simulation results for the case where eight transmitting antenna elements are used according to the present disclosure.

FIG. 8A is a first graph illustrating simulation results for the case where eight transmitting antenna elements are used according to the present disclosure, and FIG. 8B is a second graph illustrating simulation results for the case where eight transmitting antenna elements are used according to the present disclosure.

Referring to FIGS. 8A and 8B, an SNR is assumed to remain constant regardless of the distance between the transmitter (e.g. transmitting array antenna) and the receiver (e.g. receiving array antenna). The y-axis represents a value of the MIMO capacity relative to the SISO capacity under the same SNR. The x-axis represents the distance between the transmitter and the receiver, expressed as a percentage (%). On the x-axis, 100% represents the optimal distance between the transmitter and the receiver, which corresponds to the distance achieving the maximum MIMO capacity. ‘H capacity’ represents an ideal channel capacity for the channel matrix H, while ‘precoding capacity’ represents a channel capacity for the channel matrix H when the codebook proposed in the present disclosure is applied.

In FIG. 8A, a performance comparison is shown for the case where the 8×4 MIMO codebook proposed in the present disclosure is applied. In FIG. 8B, a performance comparison is shown for the case where the 8×4 MIMO codebook proposed in the present disclosure is applied. It can be seen that as the number of layers increases, the difference between ‘precoding capacity’ and ‘H capacity’ decreases.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first communication node including a first antenna array, comprising:

obtaining a channel matrix or a plurality of phase vectors based on predetermined line-of-sight multiple input multiple output (LOS MIMO) channel configuration information;

determining a precoding matrix satisfying a first condition and a second condition using the channel matrix or the plurality of phase vectors; and transmitting data to a second communication node including a second antenna array by performing beamforming at the first communication node based on the precoding matrix, wherein the first antenna array includes N elements, the second antenna array includes L elements, and each of L and N is a natural number greater than or equal to 2, wherein the precoding matrix is calculated using a Hermitian transpose of the channel matrix, and the precoding matrix is expressed as Equation 1-A using the channel matrix, $$P = \frac{1}{\sqrt{N}} \cdot \frac{1}{\sqrt{L}} \cdot H^H, \quad \text{[Equation 1-A]}$$

wherein P represents the precoding matrix, H represents the channel matrix, and $H^H$ represents the Hermitian transpose of H.

2. The method according to claim 1, wherein the precoding matrix is calculated using the plurality of phase vectors, and the precoding matrix is expressed as Equation 1-B using the plurality of phase vectors,

[Equation 1-B]

$$P = \frac{1}{\sqrt{N}} \cdot \frac{1}{\sqrt{L}} \cdot [\exp(j \cdot \pi \cdot \emptyset_1) \ \ \exp(j \cdot \pi \cdot \emptyset_2) \ \ \ldots \ \ \exp(j \cdot \pi \cdot \emptyset_L)],$$

wherein P represents the precoding matrix, and $\emptyset_1$, $\emptyset_2$, . . . , and $\emptyset_2$ represent the plurality of phase vectors.

3. The method according to claim 1, wherein the precoding matrix includes L precoding vectors, the first condition is satisfied when elements of a first precoding vector and elements of a second precoding vector among the L precoding vectors are symmetrical to each other, the precoding matrix is expressed as Equation 1-C, and each of the first precoding vector and the second precoding vector is expressed as Equation 1-D, $$P = [p_1 \ \ p_2 \ \ \ldots \ \ p_L], \quad \text{[Equation 1-C]}$$

$$p_{1+k} = [v_1 \ \ v_2 \ \ \ldots \ \ v_{N-1} \ \ v_N]^T, \quad \text{[Equation 1-D]}$$

$$p_{L-k} = [v_N \ \ v_{N-1} \ \ \ldots \ \ v_2 \ \ v_1]^T \ (k = 0, 1, \ldots, \lceil L/2 \rceil - 1),$$

wherein P represents the precoding matrix, $p_1$ $p_2$ . . . $p_L$ represent the L precoding vectors, $p_{1+k}$ represents the first precoding vector, $p_{L-k}$ represents the second precoding vector, and $\lceil x \rceil$ is a smallest integer equal to or greater than x.

4. The method according to claim 1, wherein the precoding matrix includes L precoding vectors, the second condition is satisfied when L is odd and elements of a middle precoding vector located in a middle of the L precoding vectors are symmetrical to each other, and the middle precoding vector is expressed as Equation 1-E, $$p_{L-k} = [\,v_N \;\; v_{N-1} \;\; \ldots \;\; v_2 \;\; v_1\,]^T \qquad \text{[Equation 1-E]}$$

$$v_1 = v_N,\, v_2 = v_{N-1},\, \ldots\, ,\, v_{\lceil L/2\rceil-1} = v_{\lceil L/2\rceil+1},$$

wherein $p_{\lceil L/2\rceil}$ represents the middle precoding vector, and $\lfloor x\rfloor$ is a largest integer equal to or less than x.

5. The method according to claim 1, wherein the precoding matrix is included in a codebook, and the transmitting of the data to the second communication node comprises:

transmitting a pilot signal to the second communication node;

receiving, from the second communication node, feedback information including information of a precoding matrix for a channel state between the first communication node and the second communication node;

confirming the precoding matrix included in the codebook using the feedback information; and transmitting the data to the second communication node by performing beamforming based on the precoding matrix included in the codebook.

6. A method of a second communication node, comprising:

receiving a pilot signal from a first communication node;

performing an operation of estimating a channel between the first communication node and the second communication node based on the pilot signal to obtain line-of-sight multiple input multiple output (LOS MIMO) channel information;

determining a first precoding matrix based on the LOS MIMO channel information in a codebook including two or more precoding matrixes that satisfy a first condition and a second condition; and transmitting feedback information including information of the first precoding matrix to the first communication node, wherein the first precoding matrix includes L precoding vectors, the first condition is satisfied when elements of a first precoding vector and elements of a second precoding vector among the L precoding vectors are symmetrical to each other, L is a natural number equal to or greater than 2, the first precoding matrix is expressed as Equation 2-A, and each of the first precoding vector and the second precoding vector is expressed as Equation 2-B, $$P = [\,p_1 \;\; p_2 \;\; \ldots \;\; p_L\,], \qquad \text{[Equation 2-A]}$$

$$p_{1+k} = [\,v_1 \;\; v_2 \;\; \ldots \;\; v_{N-1} \;\; v_N\,]^T, \qquad \text{[Equation 2-B]}$$

$$p_{L-k} = [\,v_N \;\; v_{N-1} \;\; \ldots \;\; v_2 \;\; v_1\,]^T \;\; (k = 0, 1, \ldots\, , \lceil L/2\rceil - 1),$$

wherein P represents the first precoding matrix, $p_1\ p_2 \ldots p_L$ represent the L precoding vectors, $p_{1+k}$ represents the first precoding vector, and $p_{L-k}$ represents the second precoding vector.

7. The method according to claim 6, wherein the first precoding matrix includes L precoding vectors, the second condition is satisfied when L is odd and elements of a middle precoding vector located in a middle of the L precoding vectors are symmetrical to each other, L is a natural number equal to or greater than 2, and the middle precoding vector is expressed as Equation 2-C, $$p_{L-k} = [\,v_N \;\; v_{N-1} \;\; \ldots \;\; v_2 \;\; v_1\,]^T \qquad \text{[Equation 2-C]}$$

$$v_1 = v_N,\, v_2 = v_{N-1},\, \ldots\, ,\, v_{\lceil L/2\rceil-1} = v_{\lceil L/2\rceil+1},$$

wherein $p_{\lceil L/2\rceil}$ represents the middle precoding vector.

8. A first communication node comprising a first antenna array and at least one processor, wherein the at least one processor causes the first communication node to perform:

obtaining a channel matrix or a plurality of phase vectors based on predetermined line-of-sight multiple input multiple output (LOS MIMO) channel configuration information;

determining a precoding matrix satisfying a first condition and a second condition using the channel matrix or the plurality of phase vectors; and transmitting data to a second communication node including a second antenna array by performing beamforming at the first communication node based on the precoding matrix, wherein the first antenna array includes N elements, the second antenna array includes L elements, and each of L and N is a natural number greater than or equal to 2, wherein the precoding matrix is calculated using a Hermitian transpose of the channel matrix, and the precoding matrix is expressed as Equation 3-A using the channel matrix, $$P = \frac{1}{\sqrt{N}} \cdot \frac{1}{\sqrt{L}} \cdot H^H, \qquad \text{[Equation 3-A]}$$

wherein P represents the precoding matrix, H represents the channel matrix, and $H^H$ represents the Hermitian transpose of H.

9. The first communication node according to claim 8, wherein the precoding matrix is calculated using the plurality of phase vectors, and the precoding matrix is expressed as Equation 3-B using the plurality of phase vectors, $$\text{[Equation 3-B]}$$

$$P = \frac{1}{\sqrt{N}} \cdot \frac{1}{\sqrt{L}} \cdot [\,\exp(j\cdot\pi\cdot\phi_1) \;\; \exp(j\cdot\pi\cdot\phi_2) \;\; \ldots \;\; \exp(j\cdot\pi\cdot\phi_L)\,],$$

wherein P represents the precoding matrix, and $\phi_1$, $\phi_2$, . . . , and $\phi_L$ represent the plurality of phase vectors.

10. The first communication node according to claim 8, wherein the precoding matrix includes L precoding vectors, the first condition is satisfied when elements of a first precoding vector and elements of a second precoding vector among the L precoding vectors are symmetrical to each other, the precoding matrix is expressed as Equation 3-C, and each of the first precoding vector and the second precoding vector is expressed as Equation 3-D, $$P = [\,p_1 \;\; p_2 \;\; \ldots \;\; p_L\,], \qquad \text{[Equation 3-C]}$$

$$p_{1+k} = [\,v_1 \;\; v_2 \;\; \ldots \;\; v_{N-1} \;\; v_N\,]^T, \qquad \text{[Equation 3-D]}$$

$$p_{L-k} = [\,v_N \;\; v_{N-1} \;\; \ldots \;\; v_2 \;\; v_1\,]^T \;\; (k = 0, 1, \ldots\, , \lceil L/2\rceil - 1),$$

wherein P represents the precoding matrix, $p_1\ p_2 \ldots p_L$ represent the L precoding vectors, $p_{1+k}$ represents the first precoding vector, $p_{L-k}$ represents the second precoding vector, and $\lceil x \rceil$ is a smallest integer equal to or greater than x.

11. The first communication node according to claim 8, wherein the precoding matrix includes L precoding vectors, the second condition is satisfied when L is odd and elements of a middle precoding vector located in a middle of the L precoding vectors are symmetrical to each other, and the middle precoding vector is expressed as Equation 3-E, $$p_{L-k} = [\,v_N \;\; v_{N-1} \;\; \ldots \;\; v_2 \;\; v_1\,]^T \qquad \text{[Equation 3-E]}$$

$$v_1 = v_N,\ v_2 = v_{N-1},\ \ldots\ ,\ v_{\lceil L/2 \rceil -1} = v_{\lceil L/2 \rceil +1},$$

wherein $p_{\lceil L/2 \rceil}$ represents the middle precoding vector, and $\lfloor x \rfloor$ is a largest integer equal to or less than x.

12. The first communication node according to claim 8, wherein the precoding matrix is included in a codebook, and in the transmitting of the data to the second communication node, the at least one processor causes the first communication node to perform:

transmitting a pilot signal to the second communication node;

receiving, from the second communication node, feedback information including information of a precoding matrix for a channel state between the first communication node and the second communication node;

confirming the precoding matrix included in the codebook using the feedback information; and transmitting the data to the second communication node by performing beamforming based on the precoding matrix included in the codebook.

* * * * *